(12) United States Patent
Inagaki (10) Patent No.: US 7,628,667 B2
(45) Date of Patent: Dec. 8, 2009

(54) METHOD FOR MANUFACTURING DISPLAY, DISPLAY, AND ELECTRONIC DEVICE

(75) Inventor: Akira Inagaki, Suwa (JP)

(73) Assignee: Seiko Epson Corporation (JP)

( * ) Notice: Subject to any disclaimer, the term of this patent is extended or adjusted under 35 U.S.C. 154(b) by 279 days.

(21) Appl. No.: 11/566,817

(22) Filed: Dec. 5, 2006

(65) Prior Publication Data

US 2007/0126337 A1    Jun. 7, 2007

(30) Foreign Application Priority Data

Dec. 7, 2005    (JP) .............................. 2005-353034

(51) Int. Cl.
*H01J 9/00* (2006.01)

(52) U.S. Cl. ........................ 445/24; 438/691; 313/495

(58) Field of Classification Search ............. 445/24–26; 427/66, 58, 64, 532–535, 539; 313/498–512; 315/169.1, 169.3; 428/690–691, 917; 438/26–29, 438/34, 82; 257/40, 72, 98–100, 642–643

See application file for complete search history.

(56) References Cited

U.S. PATENT DOCUMENTS

| 6,788,372 | B1 | 9/2004 | Kaise et al. | |
|---|---|---|---|---|
| 2005/0009230 | A1* | 1/2005 | Hasei | 438/98 |
| 2005/0230752 | A1 | 10/2005 | Kanno et al. | |

FOREIGN PATENT DOCUMENTS

| JP | 11-287983 | 10/1999 |
|---|---|---|
| JP | 2000-206541 | 7/2000 |
| JP | 2005-013985 | 1/2005 |
| JP | 2005-333118 | 12/2005 |

\* cited by examiner

*Primary Examiner*—Peter J Macchiarolo
*Assistant Examiner*—Donald L Raleigh
(74) *Attorney, Agent, or Firm*—Harness, Dickey & Pierce, P.L.C.

(57) ABSTRACT

A method for manufacturing a display including a column spacer for controlling a distance between a switching element substrate and an opposed substrate opposed to the switching element substrate that includes: a bank film formation step for forming a bank film on the switching element substrate; a concave section formation step for selectively etching the bank film to form banks; a spacer formation step for selectively forming the bank film to form the column spacer; and a functional fluid placement step for placing functional fluid in a concave section between the banks.

3 Claims, 12 Drawing Sheets

METHOD FOR MANUFACTURING DISPLAY, DISPLAY, AND ELECTRONIC DEVICE

BACKGROUND

1. Technical Field

The invention relates to a method for manufacturing a display, a display, and an electronic device.

2. Related Art

With more displays having a thinner thickness, screens having a larger area have been required including the one having a diagonal line of 40 inches.

Many displays having a thin thickness use, for example, a structure as in a liquid crystal display in which flat substrates opposed to each other control the display indication. A liquid crystal display provides a display indication by using a fact that polarization of light penetrating liquid crystals is different depending on the orientation of the liquid crystals. Specifically, the substrate sandwich sealed liquid crystals and electrodes provided at opposed surfaces of the substrates are applied with a voltage to control the orientation of the liquid crystals. The opposed substrates have therebetween a distance of a few micrometers to several tens of micrometers, This distance must be accurately maintained to be equal to or smaller than 0.05 micrometers in order to provide a uniform display.

The distance between the substrates can be determined by a spherical or fiber-like spacer. However, the spacer tends to be easily moved to cause a situation where the spacer may damage an electrode, an orientation film or the like provided on the substrate, thus causing defective indication.

JP-A-H11-287983 is an example of related art. As described in the example, in order to solve the above problem, a column-like spacer (so-called column spacer) is formed by resin to control the distance between the substrates.

However, even when the spherical or fiber-like spacer is substituted by the column spacer to control the distance between the substrates, new material and step are required, thus deteriorating a production efficiency.

SUMMARY

An advantage of the invention is to provide a method for manufacturing a display, a display, and an electronic device by which an improved production efficiency is obtained According to an aspect of the invention, a method for manufacturing a display of the invention is a method for manufacturing a display including a column spacer for controlling a distance between a switching element substrate and an opposed substrate opposed to the switching element substrate, characterized in including: a bank film formation step for forming a bank film on the switching element substrate; a concave section formation step for selectively etching the bank film to form banks; a spacer formation step for selectively forming the bank film to form the column spacer; and a functional fluid placement step for placing functional fluid in a concave section between the banks.

According to this invention, the bank film for forming the bank also can be used to form the column spacer. This eliminates the need for new material and step, thus providing an improved production efficiency.

In the invention, the column spacer is preferably formed on a region in which a switching element is formed.

In this invention, the column spacer is formed in such a region in which the switching element is formed and that is different from a display region. Thus, in addition to the above-described effect, an light transmission efficiency in a display region is improved.

In the invention, it is preferable that functional fluid is placed at a predetermined position divided by the banks to form at least one of a source electrode or a drain electrode.

In this invention, banks as a partition at a position at which functional fluid for forming at least one of a source electrode or a drain electrode is placed also functions as a column spacer. Thus, a switching element can be formed with an improved production efficiency.

According to another aspect of the invention, a display of the invention is characterized in including: a switching element substrate including banks for placing functional fluid; an opposed substrate opposed to the switching element substrate; and a column spacer provided between the switching element substrate and the opposed substrate. The banks also partially function as the column spacer.

According to this invention, a display that can achieve the above-described effect can be provided.

In the invention, the column spacer is preferably formed on a region in which the switching element is formed.

In the invention, a display that can achieve the above-described effect can be provided.

In the invention, it is preferable that at least one of a source electrode or a drain electrode is formed at a predetermined position divided by the banks.

In the invention, a display that can achieve the above-described effect can be provided.

The electronic device of the invention is characterized in including the display.

According to a further aspect of the invention, an electronic device that can achieve the above-described effect can be provided.

BRIEF DESCRIPTION OF THE DRAWINGS

The invention will be described with reference to the accompanying drawings, wherein like numbers reference like elements.

FIG. 6(*a*) is an enlarged cross-sectional view illustrating a TFT element. FIG. 6(*b*) is a partial enlarged cross-sectional view illustrating a gate wiring and a source wiring intersecting to each other in a planer manner.

DESCRIPTION OF EXEMPLARY EMBODIMENTS

Hereinafter, embodiments of the invention will be described with reference to the drawings.

Embodiment 1

Figure 1:
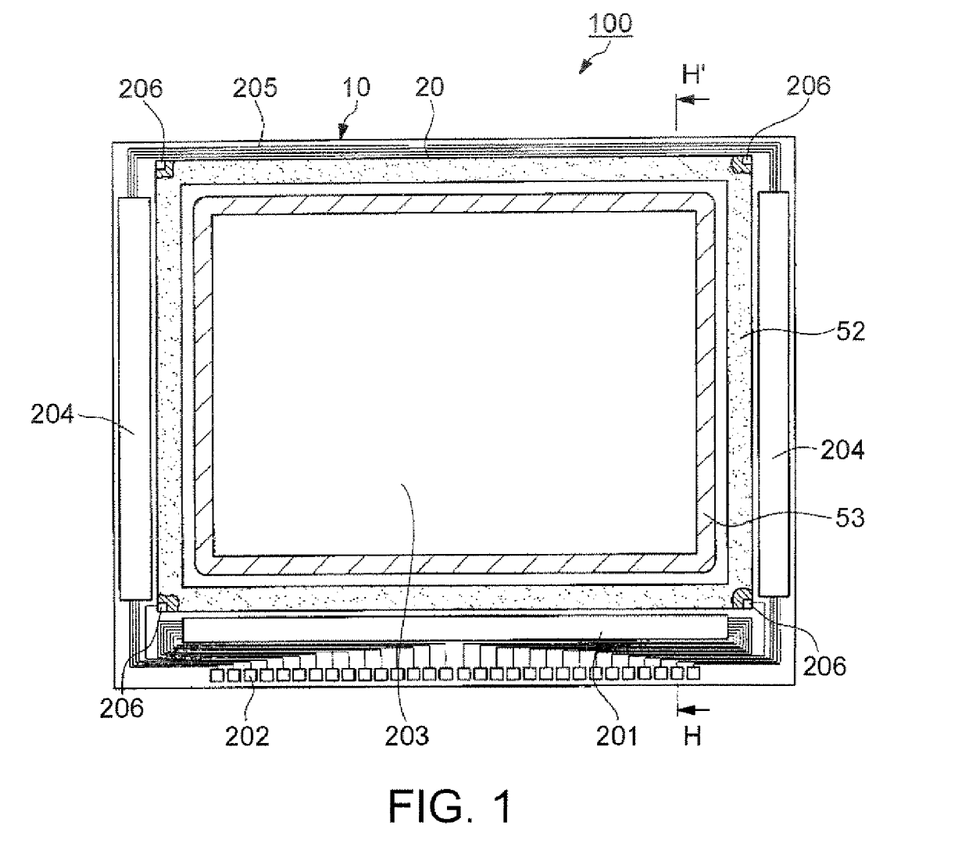
FIG. 1 is a schematic top view illustrating a liquid crystal display apparatus in Embodiment 1.
Figure 2:
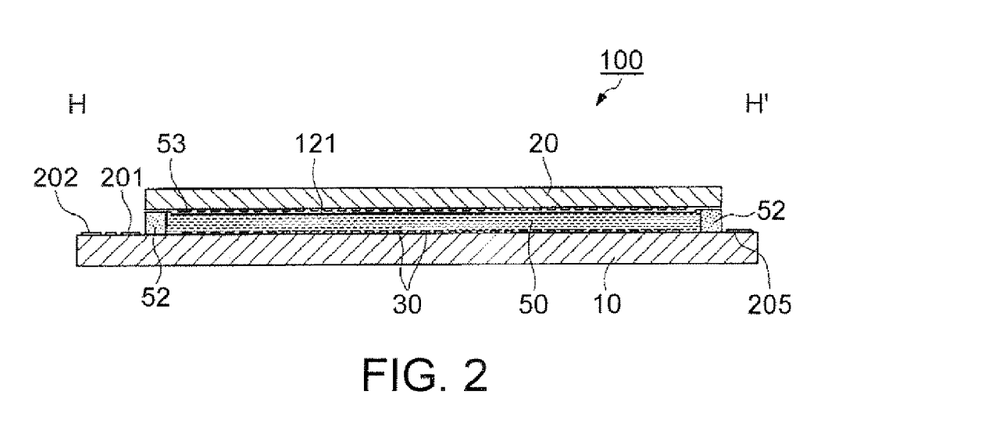
FIG. 2 is a schematic cross-sectional view illustrating the liquid crystal display apparatus.

FIG. 1 is a schematic top view illustrating a liquid crystal display apparatus 100 as a display in Embodiment 1. FIG. 2 is a schematic cross-sectional view taken along a line H-H' of FIG. 1.

The liquid crystal display apparatus 100 includes a Thin Film Transistor (TFT) element 30 as a switching element.

It is noted that the respective drawings used in the following description illustrate the respective layers and the respective members with different scales so that the respective layers and the respective members can be visually recognized in the drawings.

In FIG. 1 and FIG. 2, the liquid crystal display apparatus 100 includes: a TFT array substrate 10 on which TFT elements 30 are arranged in an array-like manner; and an opposed substrate 20. These substrates are adhered to each other by a sealing member 52 that is a photocuring sealing material. The sealing member 52 is sandwiched by the TFT array substrate 10 and the opposed substrate 20 to have a frame-like shape. A region surrounded by this sealing member 52 is filled with liquid crystal 50 and is retained.

In FIG. 1, a parting frame 53 made of light blocking material is provided at the inner side of the sealing member 52. A region at the inner side of the parting frame 53 is an actual image display region 203.

A region at the outer side of the sealing member 52 has a data line driving circuit 201 and packaging terminals 202 formed along one side of the TFT array substrate 10. Along two sides adjacent to this one side, scanning line driving circuits 204 are formed. At the remaining one side of the TFT array substrate 10, a plurality of wirings 205 are provided for connecting the scanning line driving circuits 204 provided at both sides of the image display region. At corner sections of the opposed substrate 20, inter-substrate conducting materials 206 are provided in order to provide an electric continuity between the TFT array substrate 10 and opposed electrodes 121 provided on the opposed substrate 20.

It is noted that, instead of providing the data line driving circuit 201 and the scanning line driving circuit 204 on the TFT array substrate 10, another configuration also may be used in which a Tape Automated Bonding (TAB) substrate packaged with a driving LSI and a terminal group formed to surround the TET array substrate 10 are electrically and mechanically connected to each other via an anisotropic conductive film.

In the liquid crystal display apparatus 100, a retarder, polarization plate or the like is arranged in a predetermined direction (not shown) depending on an operation mode (i.e., Twisted Nematic (TN) mode, Super Twisted Nematic (STN) mode for example) or a Normally White mode or a Normally Black mode.

Figure 3:
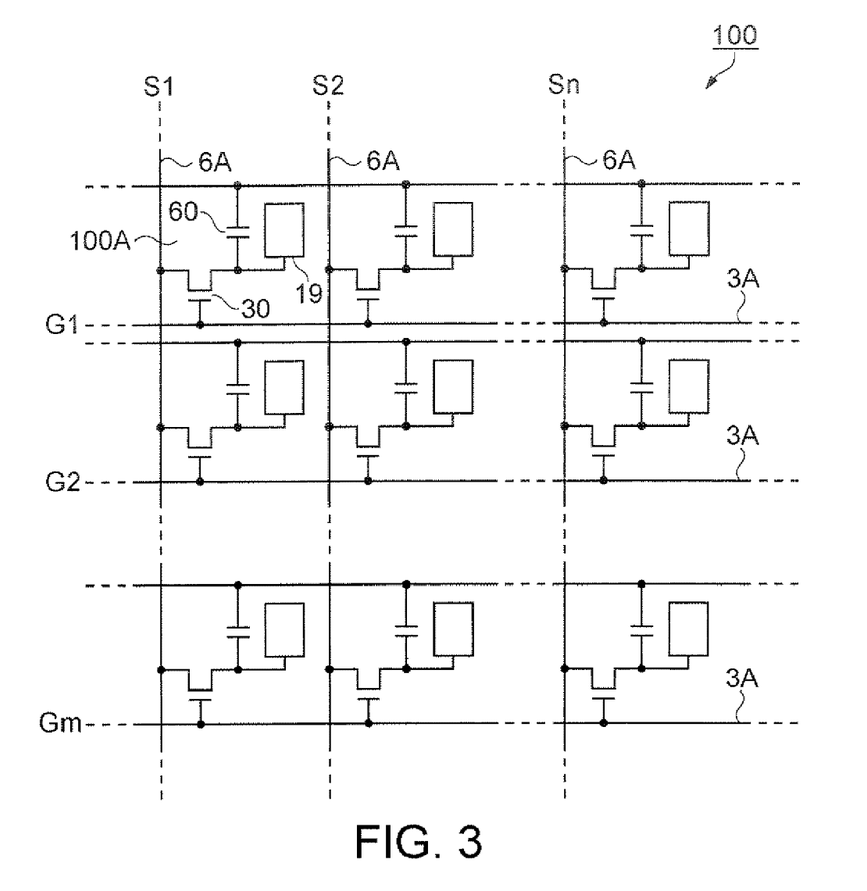
FIG. 3 is an equivalent circuit diagram of the liquid crystal display apparatus.

FIG. 3 is an equivalent circuit diagram of the liquid crystal display apparatus 100.

In the image display region 203 shown in FIG. 1, a plurality of pixels 100A are arranged in a matrix manner as shown in FIG. 3 and the respective pixels 100A include TFT elements 30. Sources of the TFT elements 30 are electrically connected with data lines 6A for transmitting pixel signals S1, S2, and Sn. The pixel signals S1, S2, ..., and Sn may be transmitted in this order or also maybe collectively transmitted to a plurality of data lines 6A adjacent to each other. Gates of the TFT elements 30 are electrically connected with scanning lines 3A. At a predetermined timing, the scanning lines 3A are applied with scanning signals G1, G2, ..., Gm in a pulse-like manner in this order.

A pixel electrode 19 is electrically connected to a drain of the TFT element 30. By turning the TFT elements 30 ON for a fixed period of time, the pixel signals S1, S2, ..., Sn sent from the data lines 6A are written to the respective pixels with a predetermined timing. In this manner, pixel signals S1, S2, ..., and Sn at a predetermined level written to the liquid crystals 50 via the pixel electrodes 19 are retained between the liquid crystals 50 and the opposed electrodes 121 shown in FIG. 2 for a fixed period of time. It is noted that, in order to prevent the retained pixel signals S1, S2, ..., and Sn from leaking, a liquid crystal capacitor sandwiched between the pixel electrode 19 and the opposed electrode 121 is attached with the storage capacitor 60 in parallel thereto. For example, a voltage applied between the pixel electrode 19 and the opposed electrode 121 is retained by the storage capacitor 60 for a time longer by three digits than a time during which a source voltage is applied. This improves a charge retention characteristic and the liquid crystal display apparatus 100 having a high contrast ratio can be realized.

Figure 4:
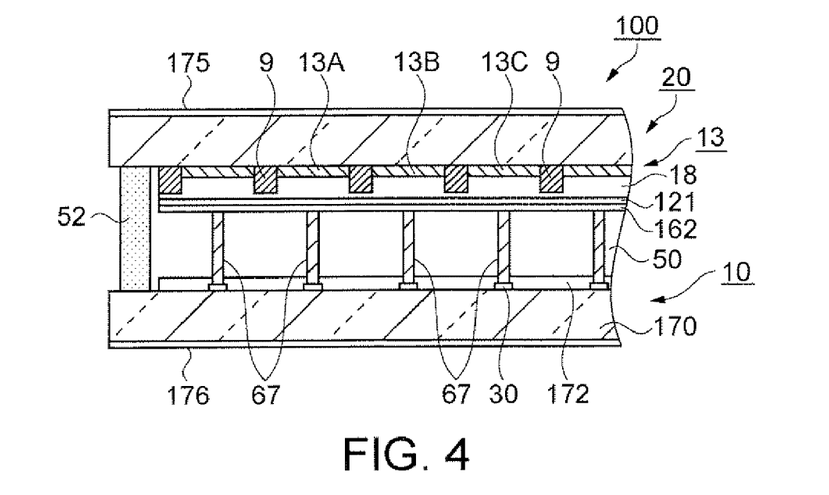
FIG. 4 is a partial enlarged cross-sectional view illustrating the liquid crystal display apparatus.

FIG. 4 is a partial enlarged cross-sectional view illustrating the liquid crystal display apparatus 100.

The liquid crystal display apparatus 100 includes a color filter 13 that is provided at the opposed substrate 20 for providing a color display. In regions corresponding to the respective pixel electrodes 19 shown in FIG. 3, color filters of red filters 13A, green filters 13B, and blue filters 13C are provided together with the protection films 18 thereof. Among the red filter 13A, the green filter 13B, and the blue filter 13C, black matrices 9 are provided.

The protection film 18 of the color filter 13 has thereon the opposed electrode 121. The opposed electrode 121 has thereon an orientation film 162. A polarization plate 175 is provided on a surface at an opposite side of a surface of the opposed substrate 20 having thereon the color filter 13.

The TFT array substrate 10 is structured to include: a transparent glass substrate 170; a TFT element 30 provided on the glass substrate 170; and an orientation film 172 formed on the glass substrate 170 and the TFT element 30 for example. A surface at an opposite side of a surface of the glass substrate 170 having thereon the TFT element 30 has thereon a polarization plate 176.

The distance between the TFT array substrate 10 and the opposed substrate 20 is controlled by a column spacer 67. The column spacer 67 is formed on a region including the TFT element 30.

Figure 5:
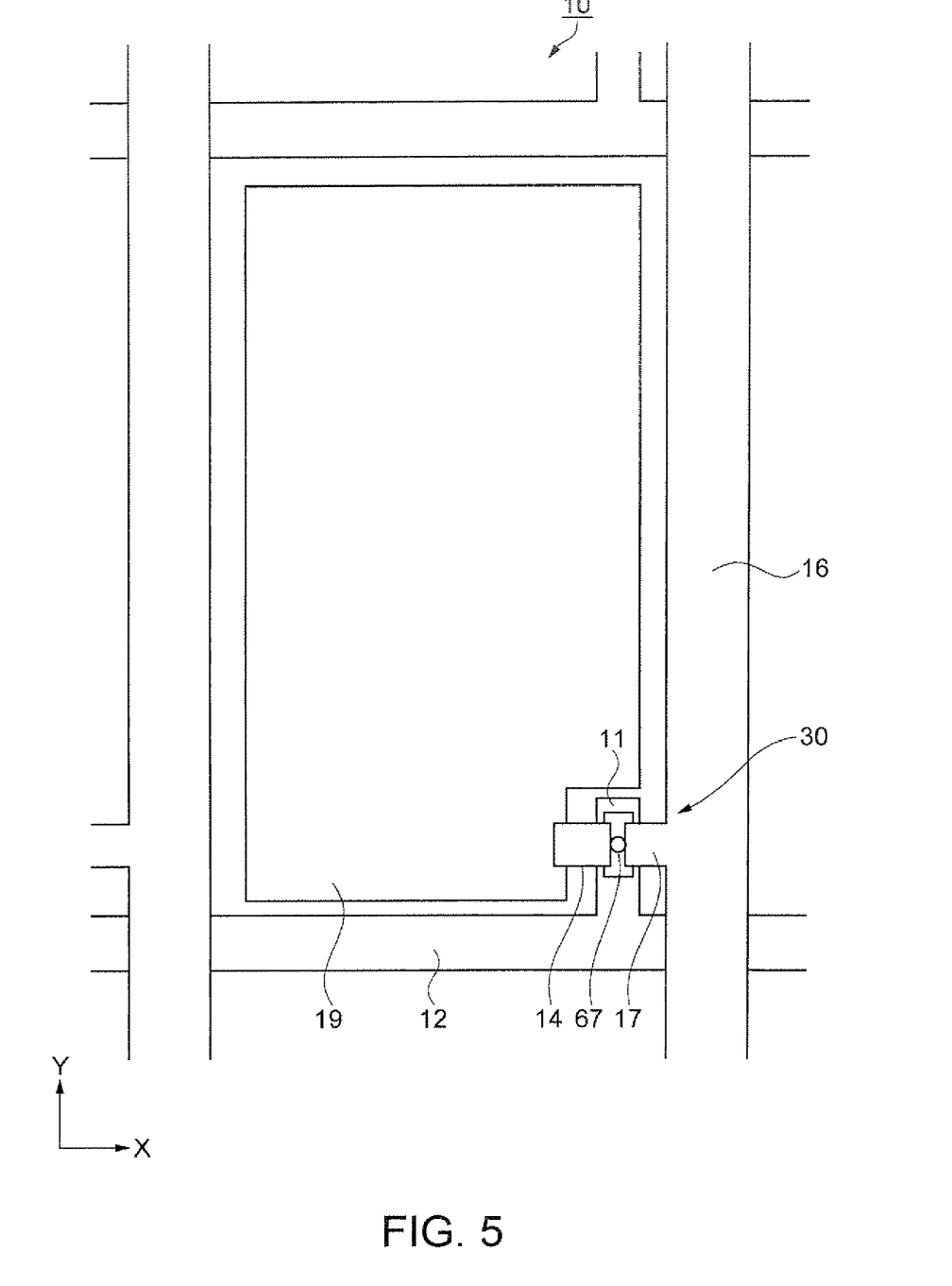
FIG. 5 is an enlarged top view illustrating a part of a TFT array substrate including a TFT element.
Figure 6A:
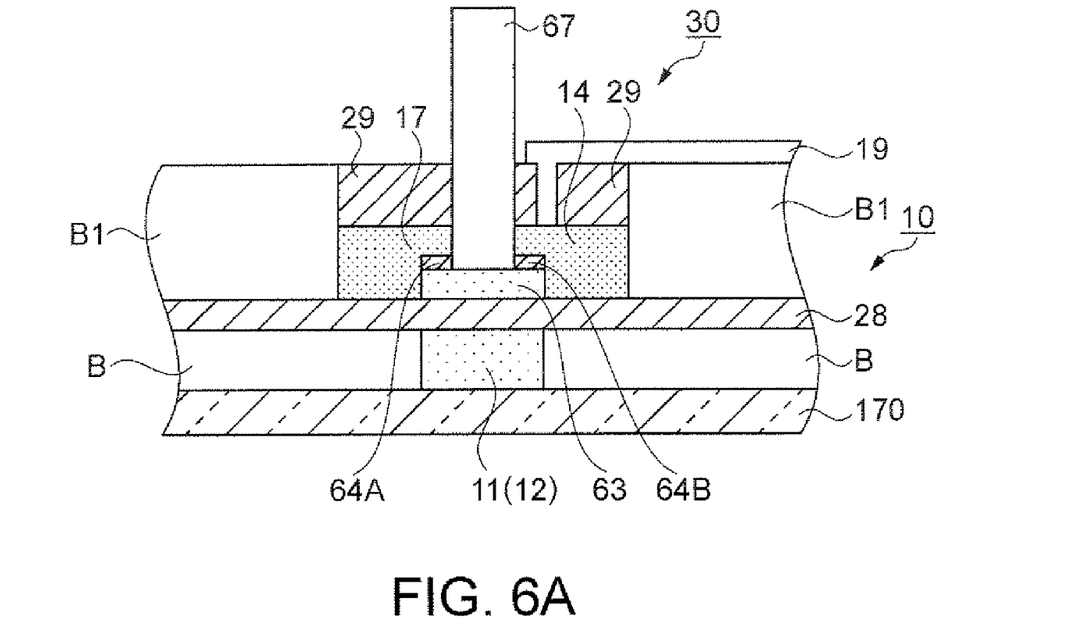
Figure 6B:
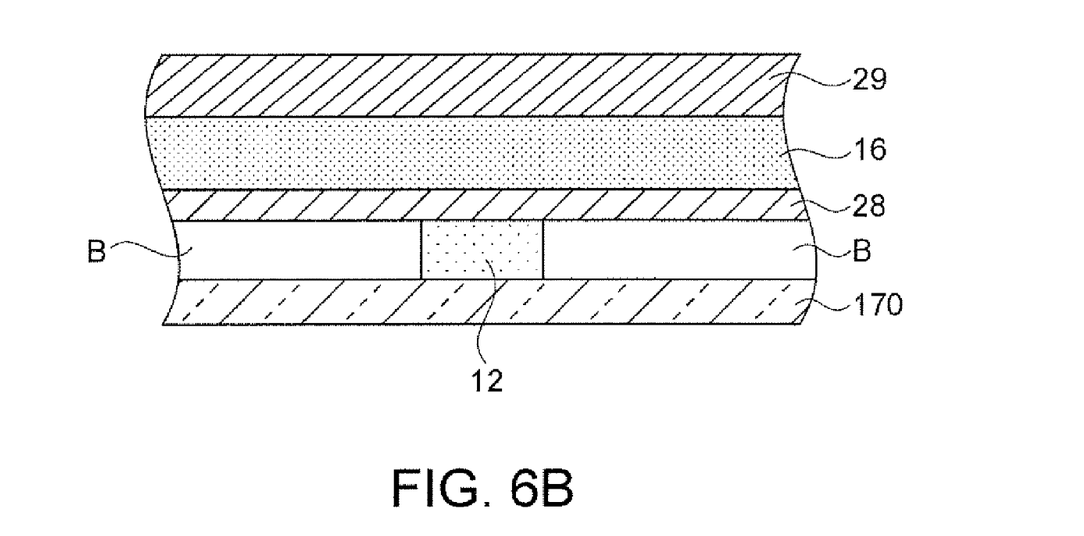

FIG. 5 is an enlarged top view including one TFT element 30 of the TFT array substrate 10. FIG. 6(a) is an enlarged cross-sectional view illustrating a part adjacent to the TFT element 30. FIG. 6(b) is an enlarged cross-sectional view illustrating a gate wiring 12 and a source wiring 16 intersecting to each other in a planer manner.

As shown in FIG. 5, the TET array substrate 10 having the TFT element 30 has thereon; a gate wiring 12; a source wiring 16; a drain electrode 14; a gate electrode 11; a pixel electrode 19 electrically connected to the drain electrode 14; and a column spacer 67.

The gate wiring 12 is formed to extend in an X axis direction so that a part thereof extends in a Y axis direction. A part of the gate wiring 12 extending in the Y axis direction is used as a gate electrode 11. It is noted that the gate electrode 11 has a width smaller than the width of the gate wiring 12. A part of the source wiring 16 formed to extend in the Y axis direction is formed to extend in the X axis direction and this part of the source wiring 16 is used as a source electrode 17.

As shown in FIGS. 6(a) and 6(b), the gate wiring 12 and the gate electrode 11 are formed between banks B provided on the glass substrate 170. The gate wiring 12, the gate electrode 11, and the banks B are covered by an insulating film 28 consisting of SiNx. The insulating film 28 has thereon: an active layer 63 as a semiconductor layer consisting of an amorphous silicon (a-Si) layer; a source wiring 16; a source electrode 17; a drain electrode 14; and the bank B1.

In FIG. 6(a), the active layer 63 is generally provided at a position opposed to the gate electrode 11. A part of the active layer 63 opposed to the gate electrode 11 is defined as a channel region. The active layer 63 has thereon a layered structure of junction layers 64A and 64B consisting of an n+-type a-Si layer for example for providing an ohmic junction. The active layer 63 is connected with the source electrode 17 via a junction layer 64A and is connected with the drain electrode 14 via a junction layer 64B. The source electrode 17 and the junction layer 64A are insulated from each other and the drain electrode 14 and the Junction layer 64B are insulated from each other by the column spacer 67 provided on the active layer 63. The column spacer 67 protrudes in a direction opposite to the glass substrate 170 and controls the distance as shown in FIG. 4 between the TFT array substrate 10 and the opposed substrate 20.

In FIGS. 6(a) and 6(b), the gate wiring 12 is insulated from the source wiring 16 by the insulating film 28. The gate electrode 11 is insulated from the source electrode 17 and the drain electrode 14 by the insulating film 28. The source wiring 16, the source electrode 17, and the drain electrode 14 are covered by the insulating film 29. A part of the insulating film 29 covering the drain electrode 14 includes a contact hole. A pixel electrode 19 consisting of Indium Tin Oxide (ITO) is connected via the contact hole to the drain electrode 14 and is formed on the upper face of the insulating film 29.

The following section will describe a process for forming a wiring pattern of the gate wiring 12 of the TFT element 30.

According to a method for forming a wiring pattern in Embodiment 1, the bank B is formed on the glass substrate 170 so as to surround a thin film formation region, functional fluid 40 for wiring pattern formation is placed at a concave section surrounded by the bank B, and a wiring film is formed on the glass substrate 170, thereby forming the wiring pattern. The functional fluid 40 can be placed by the droplet discharge method for discharging droplets.

First, the functional fluid 40 to be used will be described. The functional fluid 40 is liquid material made of dispersion liquid that is obtained by dispersing conductive particles in a dispersion medium. Conductive particles in Embodiment 1 may be. for example, metal particles including at least any one of gold, silver, copper, aluminum, palladium, or nickel; particles of the oxide thereof; and particles of conductive polymer or superconducting material. These conductive particles also may be coated with organic matter in order to have an improved dispersibility.

Each of conductive particles preferably has a particle diameter equal to or higher than 1 nm and equal to or lower than 0.1 µm. A particle diameter of 1 nm or more can reduce the volume ratio of coating agent to conductive particles to reduce a ratio of an organic matter in the resultant film. A particle diameter of 0.1 µm or less on the other hand prevents a risk where a discharge nozzle of a droplet discharge head used in the droplet discharge method from being clogged.

Any dispersion medium may be used so long as the dispersion medium can disperse the above-described conductive particles therein and prevents the aggregation. Usable dispersion medium includes, in addition to water, alcohols (e.g., methanol, ethanol, propanol, butanol), a hydrocarbon compound (e.g., n-heptane, n-octane, decane, dodecane, tetradecane, toluene, xylene, cymene, durren, inden, dipentene, tetrahydronaphthalene, decahydronaphthalene, cyclohexylbenzen), an ether compound (e.g., ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, 1,2-di methoxy ethane, bis(2-methoxy ethyl) ether, p-dioxane), or a polar compound (e.g., propylene carbonate, y-butyrolactone, N-methyl-2-pyrrolidone, dimethyl formamide, dimethyl sulfoxide, cyclohexanone). Among them, preferable dispersion media include water, alcohols, hydrocarbon compound, and ether compound because they provide a particle dispersibility, a stable dispersion liquid, and an easy application to the droplet discharge method. More preferable dispersion media include water and a hydrocarbon compound.

The above dispersion liquid of conductive particles preferably has a surface tension of 0.02N/m or more and 0.07N/m or less. When the functional fluid 40 is discharged by the droplet discharge method and when the surface tension is 0.02N/m or more, the wetting characteristic of the functional fluid 40 to a nozzle surface is reduced to suppress the droplets from bending during the flight. When the functional fluid 40 is discharged by the droplet discharge method and when the surface tension is 0.07N/m or less, the shape of meniscus at a tip end of the nozzle is stabilized to simplify the control of a discharge amount and the discharge.

In order to adjust the surface tension, the above dispersion liquid may be added with a small amount of surface tension regulator (e.g., fluorine-base, silicone-base, nonion-base one) in a range not significantly reducing the contact angle with the substrate. Nonion-base surface tension regulator improves the wetting characteristic of the functional fluid 40 to the substrate to improve the leveling characteristic of the film, which is helpful for preventing the film from having minute concavity and convexity for example. The above surface tension regulator may include, as required, an organic compound (e.g., alcohol, ether, ester, ketone).

The above dispersion liquid preferably has a viscosity equal to or higher than 1 mPa·s and equal to or lower than 50 mPa·s. When the droplet discharge method is used to discharge the functional fluid, a viscosity of 1 mPa·s or more suppresses the periphery of the nozzle from being contaminated by the flowout of the functional fluid. A viscosity of 50 mPa·s or less reduces a frequency with which a nozzle hole is clogged, thus allowing droplets to be discharged in a smooth and easy manner.

Figure 7:
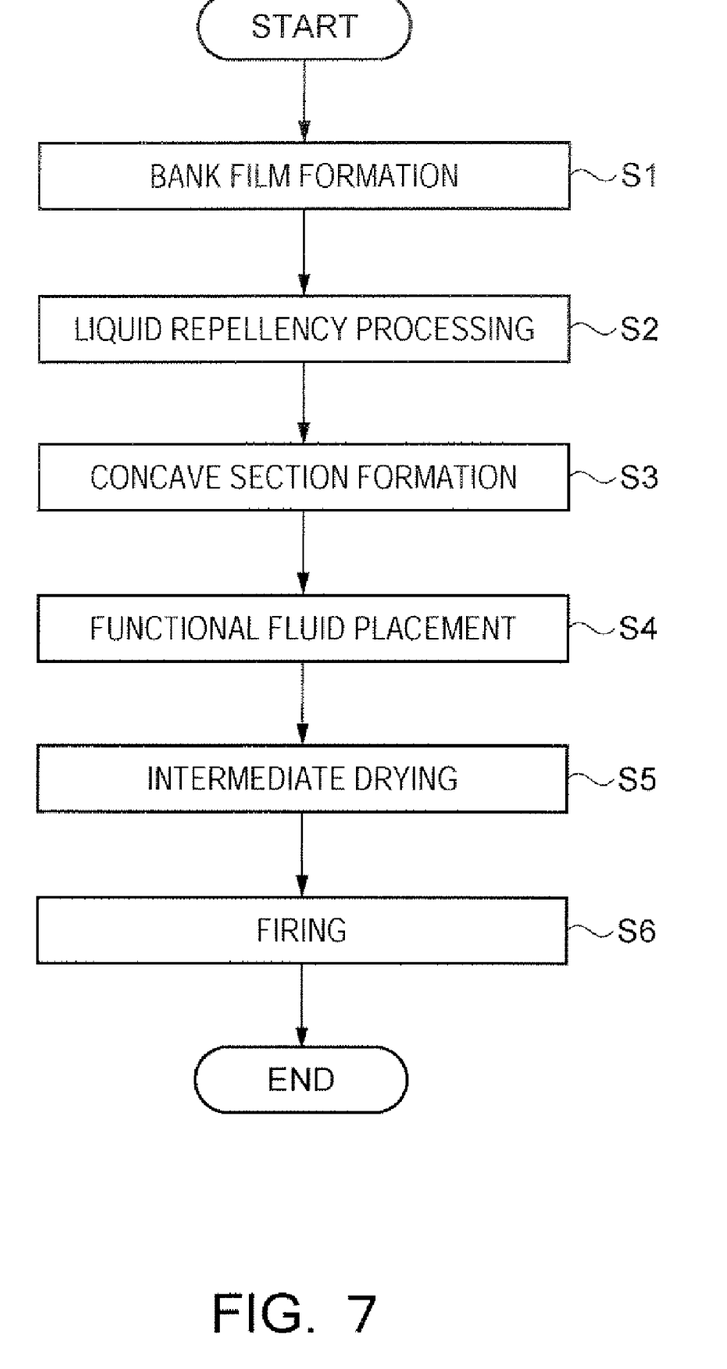
FIG. 7 is a flowchart illustrating a method for forming a wiring pattern.

FIG. 7 is a flowchart illustrating an example of a method for forming a wiring pattern in Embodiment 1.

Step S1 is a bank film formation step for forming, on the glass substrate 170, a bank film 31 for forming the bank B. Step S2 is a liquid repellency processing step for making the surface of the bank film 31 to be liquid-repellent. Step S3 is a concave section formation step for etching the bank film 31 depending on the pattern shape of the gate wiring 12 to form the bank B. Step S4 is a functional fluid placement step for placing the functional fluid 40 in a concave section between the liquid-repellent banks B. Step S5 is an intermediate drying step for removing at least a part of a liquid component of the functional fluid 40. Step S6 is a firing step for subjecting, when conductive particles included in the functional fluid 40 are made of an organic silver compound, the conductive particles to a heat treatment so that the conductive particles are conductive.

The following section will describe in detail a process for forming the gate wiring 12 with regards to the respective steps.

FIG. 8 is a schematic cross-sectional view illustrating an example of a procedure for forming the gate wiring 12.

First, Step S1 as a bank film formation step will be described.

Figure 8A:
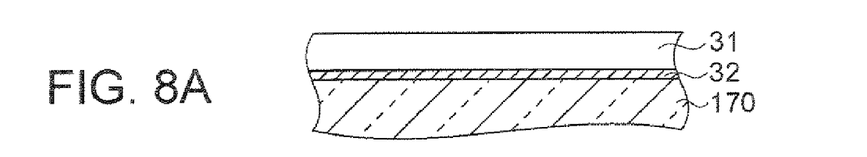
FIG. 8 is a schematic cross-sectional view illustrating a procedure for forming a gate wiring.
Figure 8B:
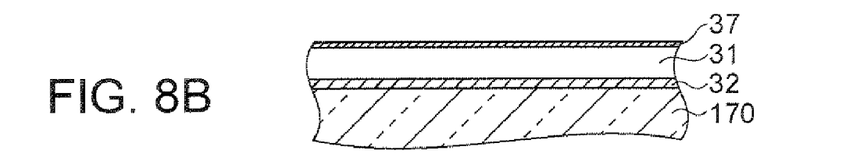

In FIG. 8(a), before the material of the bank film 31 is coated, the glass substrate 170 is subjected to a HMDS processing as a surface modification processing. The HMDS processing is a processing for coating hexamethyldisilazane ((CH$_3$)$_3$SiNHSi(CH$_3$)$_3$) in a vapor status. As a result, the HMDS layer 32 as an adhesive layer for improving the adhesiveness between the bank film 31 and the glass substrate 170 is formed on the glass substrate 170.

The bank B made of the bank film 31 is a member functioning as a partition member. The bank B can be formed by an arbitrary method such as the photolithography method or a print process. When the photolithography is used for example, material for forming the bank film 31 is coated by a predetermined method (e.g., spin coat, spray coat, roll coat, die coat, dip coat).

The HMDS layer 32 of the glass substrate 170 is coated with material for forming the bank film 31 until a height of the bank B is reached, thereby providing the bank film 31 shown in FIG. 8(a).

Material for forming the bank film 31 may be material that is lyophilic to the functional fluid 40 such as, for example, high-polymer inorganic material or photosensitive inorganic material including silicon in a skeleton (e.g., polysilazane, polysiloxane, siloxane-base resist, polysilane-base resist); and a spin-on glass film, a diamond film, or a fluorinatedamorphous carbon film including any of silica glass, alkyl siloxane polymer, alkyl silsesquioxane polymer, hydrogenated alkyl silsesquioxane polymer, or polyarylether. Material for forming the bank film 31 that is lyophilic to the functional fluid 40 also may be, for example, aerogel or porous silica.

Material for forming the bank film 31 also may be organic material such as, for example, high-polymer material (e.g., acryl resin, polyimide resin, olefin resin, phenol resin, melamine resin).

Material for forming the bank film 31 preferably is lyophilic so as to provide a contact angle of the functional fluid 40 to the bank film 31 of 40° or less. A contact angle of the functional fluid 40 to the bank film 31 smaller than 40° causes a side face 36 of the concave section 34 (which will be described later) to have a contact angle to the functional fluid 40 smaller than 40°, causing a tendency where the dropped functional fluid 40 in a wet condition to easily expand to the concave section 34.

Next, Step S2 as a liquid repellency processing step will be described. The liquid repellency processing step subjects the bank film 31 to a liquid repellency processing so that a surface of the bank film 31 is liquid-repellent. The liquid repellency processing is a plasma processing method (CF$_4$ plasma processing method) using carbon tetrafluoride (tetrafluoromethane) as processing gas. The CF$_4$ plasma processing is performed based on conditions, for example, of a plasma power of 50 to 1000 W, the flow rate of carbon tetrafluoride gas of 50 to 100 mL/min, a transportation rate of a substrate to a plasma discharging electrode of 0.5 to 1020 mm/sec, and a substrate temperature of 70 to 90 degrees. Processing gas is not limited to tetrafluoromethane and also may be other fluorocarbon-base gas or gas such as SF$_6$ or SF$_5$CF$_3$.

The liquid repellent processing as described above allows, as shown in FIG. 8(b), the surface of the bank film 31 to have thereon a liquid repellent-processed layer 37 obtained by introducing a fluorine group into resin constituting the bank film 31, thus providing a high liquid repellency to the functional fluid. The liquid repellent-processed layer 37 is preferably liquid-repellent so as to provide a contact angle to the functional fluid 40 of 40° or more. A contact angle of 40° or more suppresses the functional fluid 40 from remaining on the upper face of the bank B. Thus, the dropped functional fluid 40 easily moves from the upper face of the bank B to the concave section 34 (which will be described later).

Figure 8C:
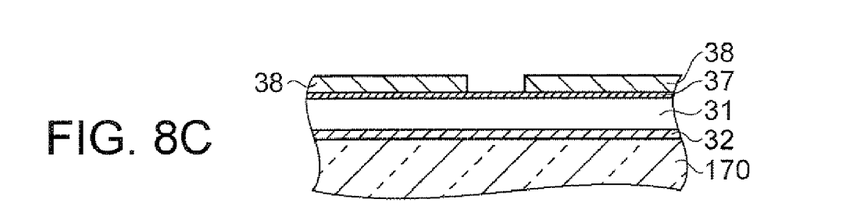

Next, Step S3 as a concave section formation step will be described. The concave section formation step uses the photolithography method to remove a part of the bank film 31 to provide the concave section 34 surrounded by the banks B. First, a resist layer is coated on the bank film 31 formed by Step S1 as a bank film formation step. Next, the resist layer is covered by a mask suitable for the shape of the bank (shape of wiring pattern) to expose and develop the resist layer, thereby forming, as shown in FIG. 8(c), a resist 38 having a shape corresponding to the shapes of the banks B. Finally, an etching is performed to remove the bank film 31 other than a part covered by the resist 38, thereby removing the remaining resist 38.

Figure 8D:
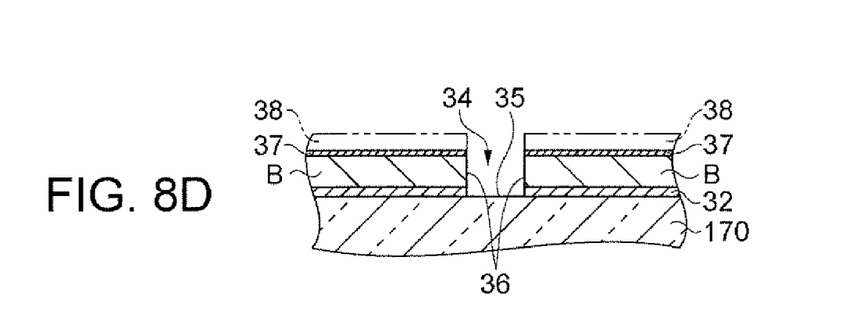

Next, the banks B formed on the glass substrate 170 are subjected to a hydrofluoric acid processing. The hydrofluoric acid processing subjects the banks B to an etching by 2.5% hydrofluoric acid aqueous solution for example to remove the HMDS layer 32 between the banks B. In the hydrofluoric acid processing, the banks B function as a mask to remove, as shown in FIG. 8(d), the HMDS layer 32 that is an organic matter at the bottom section 35 of the concave section 34 formed between the banks B to expose the glass substrate 170. The glass substrate 170 on which a wiring pattern is formed may be made of glass or silica glass that is lyophilic to the functional fluid 40. Thus, the bottom section 35 at which the glass substrate 170 is exposed is lyophilic to the functional fluid 40.

As a result, the concave section 34 surrounded by the banks B as shown in FIG. 8(d) is formed and Step S3 as a concave section formation step is completed. The upper faces of the banks B formed by the concave section formation step have thereon liquid repellent-processed layers 37 formed by the above-described liquid repellency processing and are liquid repellent to the functional fluid 40. In contrast with this, the side face 36 of the bank B has material for forming the bank film 31 that is lyophilic to the functional fluid 40 and that is directly exposed. Thus, the side face 36 is lyophilic to the functional fluid 40. As described above, the bottom section 35 is lyophilic to the functional fluid 40 and the concave section 34 is composed of the lyophilic side faces 36 and bottom section 35.

Next, Step S4 as a functional fluid placement step will be described.

Figure 8E:
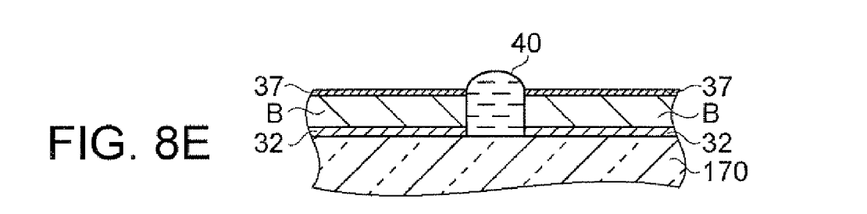

The functional fluid placement step uses the droplet discharge method by a droplet discharge apparatus to place droplets of the functional fluid 40 for forming a wiring pattern on the concave section 34 between the banks B on the glass substrate 170. This example uses an organic silver compound as conductive material and discharges the functional fluid 40 consisting of an organic silver compound using diethylene glycol diethyl ether as solvent (dispersion medium). Droplets of the functional fluid 40 are discharged to the concave section 34 between the banks B to place the functional fluid 40 in the concave section 34. A region in which a wiring pattern is to be formed (i.e., concave section 34) is surrounded by the banks B as shown in FIG. 8(e). Thus, droplet can be prevented from expanding to a part other than the predetermined area.

Next, Step S5 as an intermediate drying step will be described.

After droplets are discharged to the glass substrate 170, a drying processing is optionally performed in order to remove the dispersion medium of the functional fluid 40 and to secure a thickness of the functional fluid 40. The drying processing may be performed, for example, by a general hot plate method for heating the glass substrate 170, a drying processing by an electric furnace, or a lamp annealing. A light source used for a lamp annealing is not particularly limited and may be an infrared lamp, a xenon lamp, YAG laser, argon laser, carbon dioxide gas laser, or excimer laser (e.g., XeF, XeCl, XeBr, KrF, KrCl, ArF, ArCl) for example. These light sources generally have an output of 10 W or more and 5000 W or less. However, a light source of 100 W or more and 1000 W or less suffices in Embodiment 1.

Figure 8F:
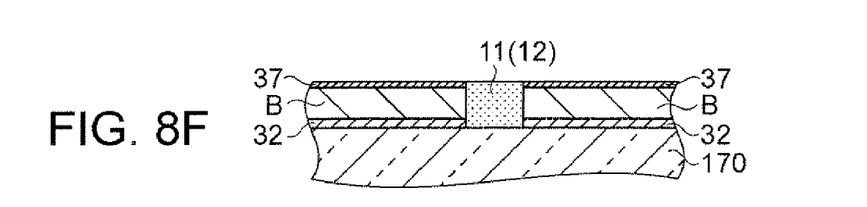

After the intermediate drying step, the gate wiring 12 and the gate electrode 1 as shown in FIG. 8(f) are formed.

Next, Step S6 as a firing step will be described. When a dried film after the intermediate drying step is made of an organic silver compound, the film must be subjected to a heat treatment so that the film is conductive to remove organic components of the organic silver compound and to leave silver particles. For this reason, the substrate after the discharge step is subjected to a heat treatment and/or an optical processing.

A heat treatment and/or an optical processing is/are generally performed in air but also can be optionally performed in inert gas atmosphere (e.g., nitrogen, argon, helium) or reduction atmosphere (e.g., hydrogen). A heat treatment and/or an optical processing is/are performed by a processing temperature that is appropriately determined in consideration of a boiling point of dispersion medium (vapor pressure), the type and the pressure of atmosphere gas, the thermal behavior of particles (e.g., dispersibility, oxidative property), the existence or nonexistence of coating material, and an upper temperature limit of a base material for example. In Embodiment 1, a pattern of the discharged functional fluid 40 is subjected to a firing step in a clean oven in air at 280 to 300 degrees for 300 minutes. For example, in order to remove organic components of an organic silver compound, a firing at about 200 degrees is required. When a substrate is made of plastic for example, a firing is preferably performed at a temperature equal to or higher than a room temperature and lower than 250 degrees. By the step as described above, the dried film after the discharge step can secure an electrical contact among particles and is converted to a conductive film.

The following section will describe a method for manufacturing the TFT element 30 and the column spacer 67 with reference to the drawings.

Figure 9:
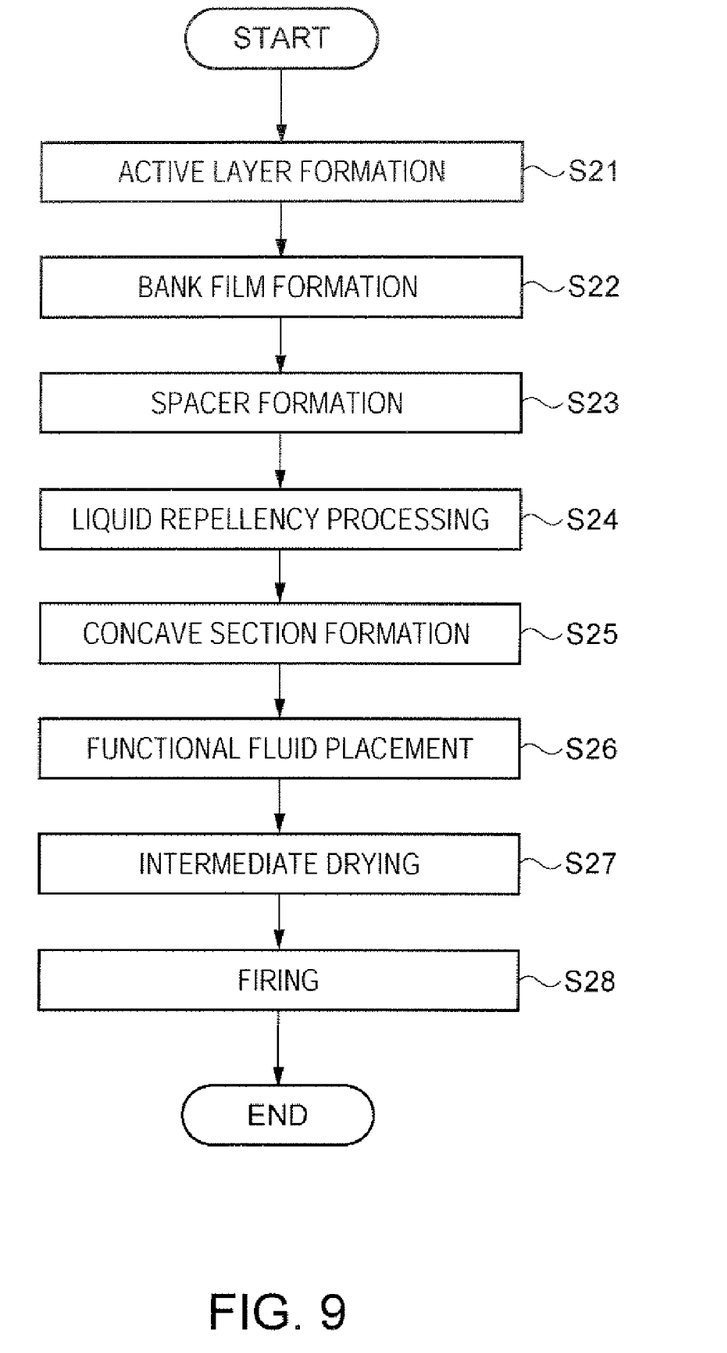
FIG. 9 is a flowchart illustrating a method for forming a TFT element part.

FIG. 9 is a flowchart illustrating a method for manufacturing the TFT element 30 and the column spacer 67.

Step S21 is an active layer formation step for forming the active layer 63 as a semiconductor layer for example. Step S22 is a bank film formation step for forming the bank film 71 for forming the bank B1 or the like. Step S23 is a spacer formation step for forming the column spacer 67 from the bank film 71. Step S24 is a liquid repellency processing step for making a surface of the bank film 71 to be liquid-repellent. Step S25 is a concave section formation step for etching the bank film 71 so as to form the concave section 74 depending on the shape of the wiring pattern. Step S26 is a functional fluid placement step for placing functional fluid 81 into the concave section 74 between the liquid-repellent banks B1. Step S27 is an intermediate drying step for removing at least a part of liquid components of the functional fluid 81. Step S28 is a firing step for subjecting, when conductive particles included in the functional fluid 81 are made of an organic silver compound, the conductive particles to a heat treatment in order that the particles are conductive.

The following section will describe the details of the respective steps.

FIG. 10 illustrates an active layer formation step to a column spacer formation step. FIG. 11 illustrates a liquid repellency processing step to a concave section formation step. FIG. 12 illustrates a functional fluid placement step to a firing step. FIG. 13 illustrates steps for completing the liquid crystal display apparatus 100.

Figure 10A:
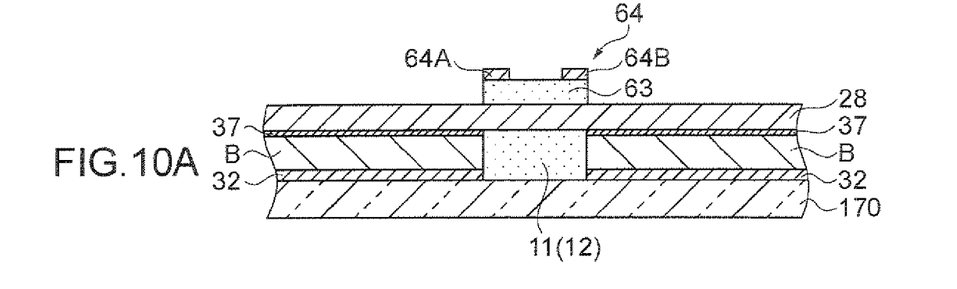
FIG. 10 is a schematic cross-sectional view illustrating an active layer formation step to a column spacer formation step.

As shown in FIG. 10(a), Step S21 as an active layer formation step uses the plasma CVD method to sequentially form the insulating film 28 as a gate insulating film, the active layer 63 as a semiconductor layer, and the junction layer 64.

The insulating film 28 is a silicon nitride film. The active layer 63 is an amorphous silicon film. The junction layer 64 is an n+-type silicon film. These insulating film 28, active layer 63, and junction layer 64 are formed by changing raw material gas or plasma conditions. When the insulating film 28, active layer 63, and junction layer 64 are formed by the CVD method, a heat history of 300 to 350 degrees is required However, problems related to transparency and heat resistance can be avoided if the bank is made of silica glass-base material having a structure in which a main chain of a basic skeleton includes silicon as a main component and a side chain includes carbon hydride or the like.

Next, the junction layer 64 is etched and divided to the junction layer 64A joined to the source electrode 17 and the junction layer 64B joined to the drain electrode 14.

Next, Step S22 as a bank film formation step will be described

Figure 10B:
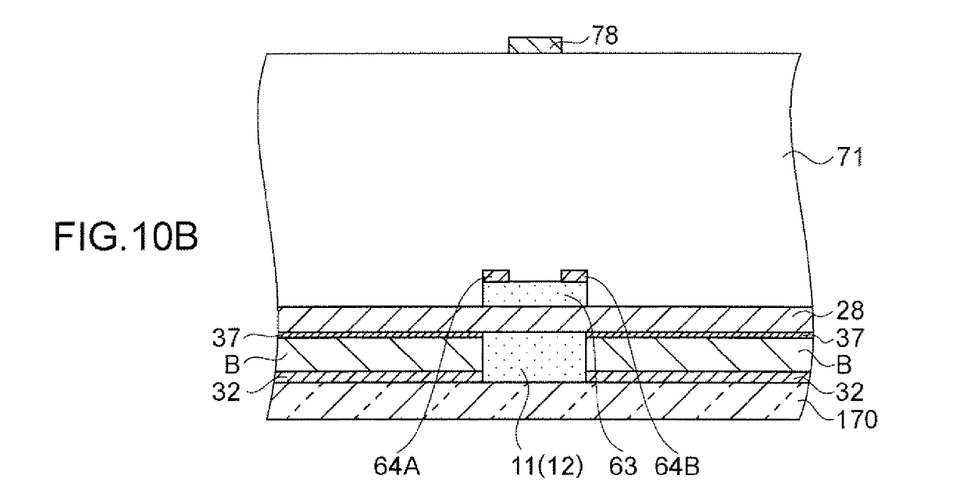
Figure 10C:
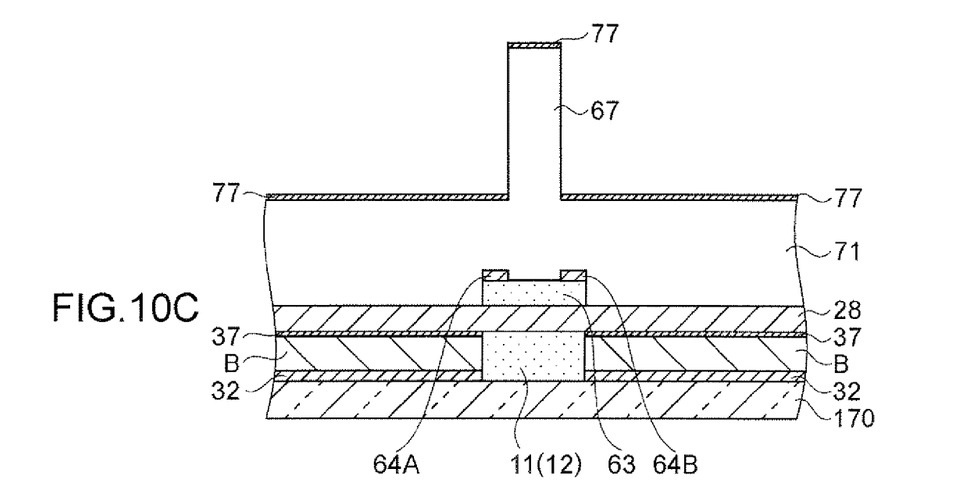

Banks B1 and B2 are made of the bank film 71 and cab be formed by the same method as that for forming the banks B. Material for forming the bank film 71 is formed on the insulating film 28 to have a height that can cover the active layer 63 and the junction layer 64, thereby providing the bank film 71 as shown in FIG. 10(b).

The bank film formation step uses such material for forming the bank film 71 that is similar to material for forming the bank film 31 and that is lyophilic to the functional fluid 81. The material for forming the bank film 71 is also material for forming the column spacer 67 and thus is preferably the above-described organic material that can absorb an impact by an external force. Material for forming the bank is preferably lyophilic so as to have a contact angle to the functional fluid 81 of 40° or less. When material for forming the bank has a contact angle of 40° or more, the material may have an insufficient lyophilic property depending on the shape of the concave section 74 (see FIG. 11(e)).

Next, Step S23 as a column spacer formation step will be described.

Resist 78 is formed on the corresponding region on the bank film 71 between the junction layers 64A and 64B. Thereafter, the photolithography method is used to etch the bank film 71 to form the column spacer 67. The column spacer 67 is formed to have a height corresponding to a distance between the TFT array substrate 10 and the opposed substrate 20. Thus, the etching is performed until the column spacer 67 has the height (see FIG. 10(c)). The resist 78 has a planar shape that is a cross-sectional shape of the column spacer 67. In Embodiment 1, the resist 78 has a circular planar shape (see FIG. 5).

Next, Step S24 as a liquid repellency processing step will be described, The liquid repellency processing step subjects the bank film 71 to the liquid repellency processing so that the surface thereof is liquid-repellent. The liquid repellency processing may use the above-described method.

The liquid repellent processing as described above allows, as shown in FIG. 10(c), the surface of the bank film 71 to have thereon a liquid repellent-processed layer 77 in which a fluorine group is introduced in resin constituting the bank film 71. Thus, the functional fluid 81 has a high liquid repellency. The liquid repellent-processed layer 77 preferably has a liquid repellency to provide a contact angle to the functional fluid 81 of 40° or more.

Next, Step S25 as a concave section formation step will be described.

The concave section formation step uses the photolithography method to remove a part of the bank film 71 to form the bank B1 and the bank B2 as well as the concave section 74 surrounded by the bank B1 and the bank B2.

Figure 11D:
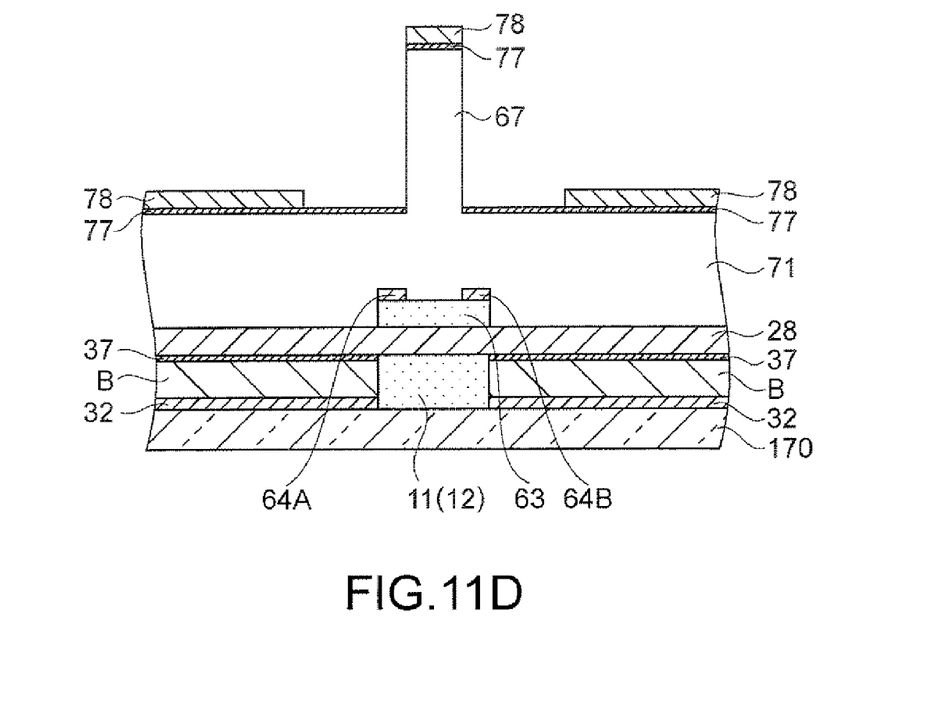
FIG. 11 is a schematic cross-sectional view illustrating a liquid repellency processing step to a concave section formation step.

First, a resist layer is coated on the column spacer 67 on the bank film 71. Next, a mask suitable for the shape of the bank (shape of a wiring pattern) is provided to expose and develop the resist. As a result, the resist 78 as shown in FIG. 11(d) is left on the column spacer 67 so that the resist 78 has a shape corresponding to the shape of the bank. Thereafter, an etching is performed. Finally, the resist 78 is removed.

Figure 11E:
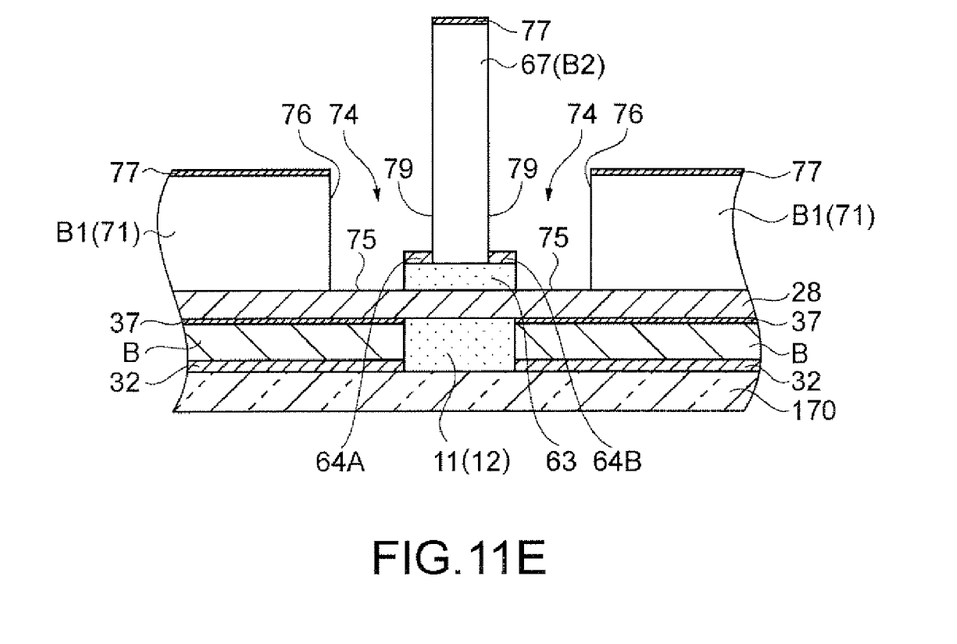

As a result, the concave section 74 as shown in FIG. 11(e) surrounded by the bank B1 and the bank B2 is formed, thereby completing Step S25 as a concave section formation step. The bank B1 and the bank B2 formed by the concave section formation step have thereon the liquid repellent-processed layers 77 formed by the liquid repellency processing step so that the upper faces of the bank B1 and the bank B2 are liquid repellent to the functional fluid. On the contrary, the side face 76 of the bank B1 directly exposes the material for forming the bank film 71 that is lyophilic to the functional fluid and thus is lyophilic to the functional fluid 81. Similarly, the side face 79 of the bank B2 directly exposes the material for forming the bank film 71 and thus is lyophilic to the functional fluid 81. It is noted that the bottom face 75, the active layer 63, and junction layers 64A and 64B at the surface of the insulating film 28 are lyophilic to the functional fluid and the concave section 74 is composed by the lyophilic side faces 76 and 79, the active layer 63, the junction layer 64, and the bottom face 75.

Next, Step S26 as a functional fluid placement step will be described.

Figure 12A:
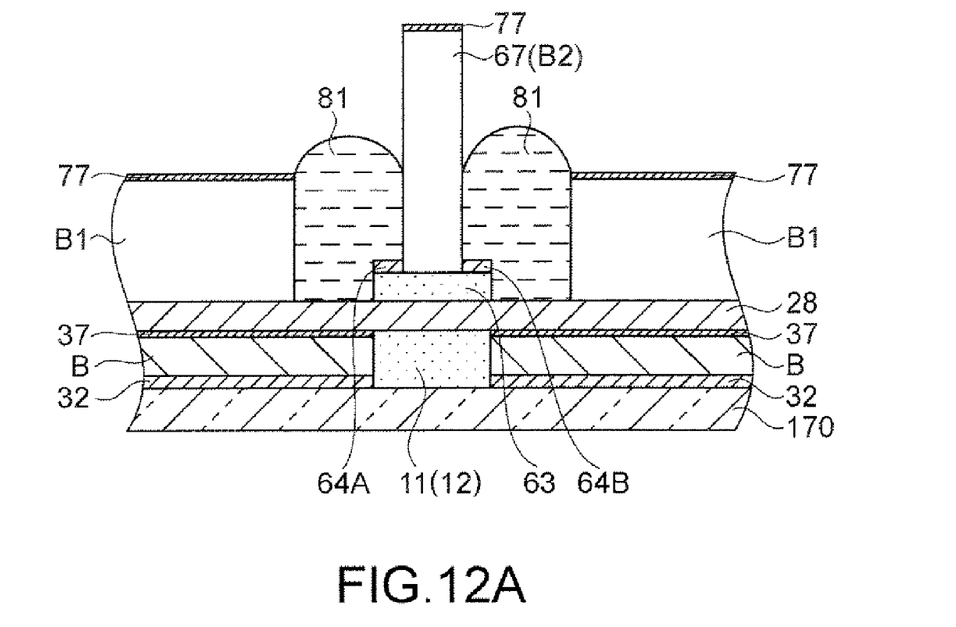
FIG. 12 is a schematic cross-sectional view illustrating a functional fluid placement step to a firing step.

In FIG. 12(a)₇, the functional fluid placement step uses the droplet discharge method to place droplets of the functional fluid 81 for forming a wiring pattern in the concave section 74 formed by the banks B1 and B2. This example uses an organic silver compound as conductive material to discharge the functional fluid 81 consisting of an organic silver compound using diethylene glycol diethyl ether as a dispersion medium. The functional fluid placement step discharges droplets of the functional fluid 81 to the concave section 74 to place the functional fluid 81 in the concave section 74. During the placement, a region in which a wiring pattern is to be formed and to which droplets are discharged (i.e., concave section 74) is surrounded by the banks B1 and B2, thus preventing droplets from expanding to a part other than a predetermined position.

The width of the concave section 74 (the width of an opening of the concave section 74) is set to be substantially the same as a diameter of a droplet of the functional fluid 81. It is noted that atmosphere in which the droplets are discharged is preferably provided with a temperature of 60 degrees or less and a humidity of 80% or less. This can provide a stable discharge of droplets without causing a discharge nozzle from being clogged.

The functional fluid 81 that is discharged into the concave section 74 or that flows from the surface of the bank B1 or B2 easily expands on the bottom face 75 and the side face 76 because the bottom face 75 and the side face 76 are lyophilic. This allows the functional fluid 81 to be filled into the concave section 74 in a more uniform manner.

Next, Step S27 as an intermediate drying step will be described.

Figure 12B:
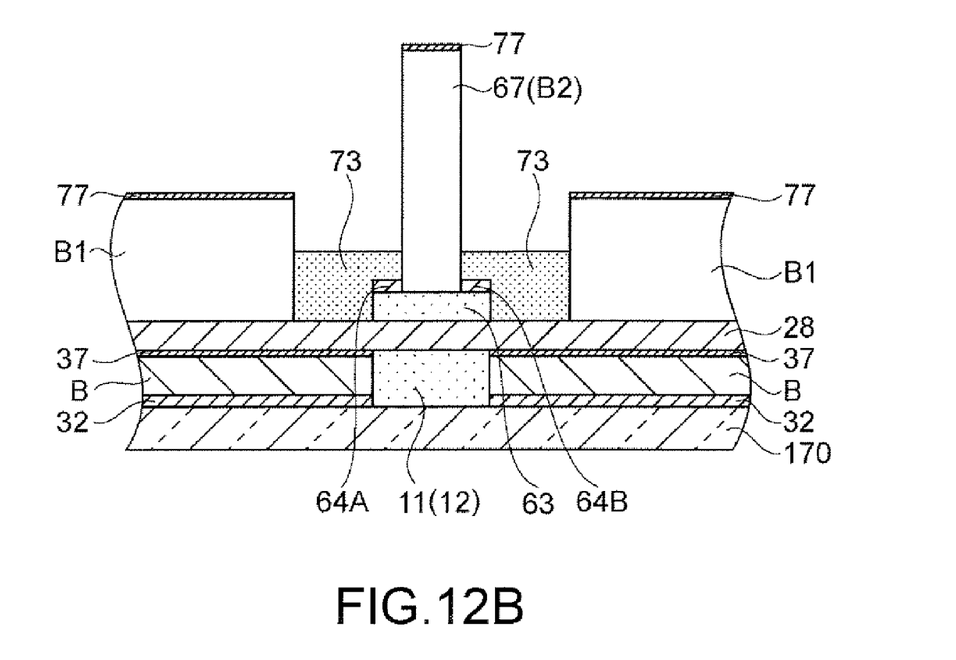

In order to remove the dispersion medium of the functional fluid 81 and to secure the thickness, a drying processing is performed as required. Step S27 is basically the same intermediate drying step as that of Step S5. Step S27 as an intermediate drying step forms the circuit wiring film 73 as a wiring film for forming a wiring pattern as shown in FIG. 12(b). In Embodiment 1, a wiring pattern formed by the circuit wiring film 73 is the source wiring 16, the source electrode 17, and the drain electrode 14 shown in FIG. 5 and FIG. 6.

When the thickness of the circuit wiring film 73 that can be formed by one functional fluid placement step and one intermediate drying step does not reach a required thickness, this intermediate drying step and the functional fluid placement step are alternately performed. It is noted that a required thickness can be obtained by appropriately selecting, based on the thickness of the circuit wiring film 73 that can be formed by one functional fluid placement step and one intermediate drying step and the required thickness, the number of repetitions of the intermediate drying step and the functional fluid placement step. Alternatively, a different type of the functional fluid 81 also may be layered to provide a required thickness.

Next, Step S28 as a firing step will be described.

When a dried film after the intermediate drying step is made of an organic silver compound, the film must be subjected, in order to cause the film to be conductive, to a heat treatment to remove the organic component of the organic silver compound and to leave silver particles. For this purpose, the substrate after the discharge step is subjected to a heat treatment and/or an optical processing.

Step S28 as a firing step is basically the same as the above-described firing step of Step S6. Step S28 as a firing step allows the dried film to secure an electrical contact among particles to allow the dried film to be converted to a conductive film. By the above-described steps, the dried film after the discharge step secures an electrical contact among particles and is converted to a conductive film.

The following section will describe a step for forming the liquid crystal display apparatus 100.

Figure 13C:
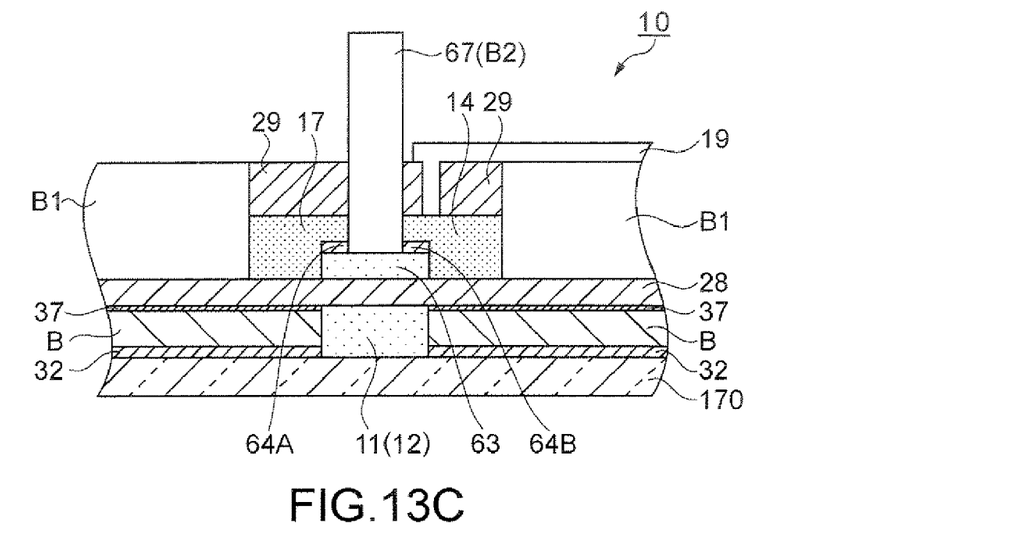
FIG. 13 is a schematic cross-sectional view illustrating steps for completing a liquid crystal display apparatus.
Figure 13D:
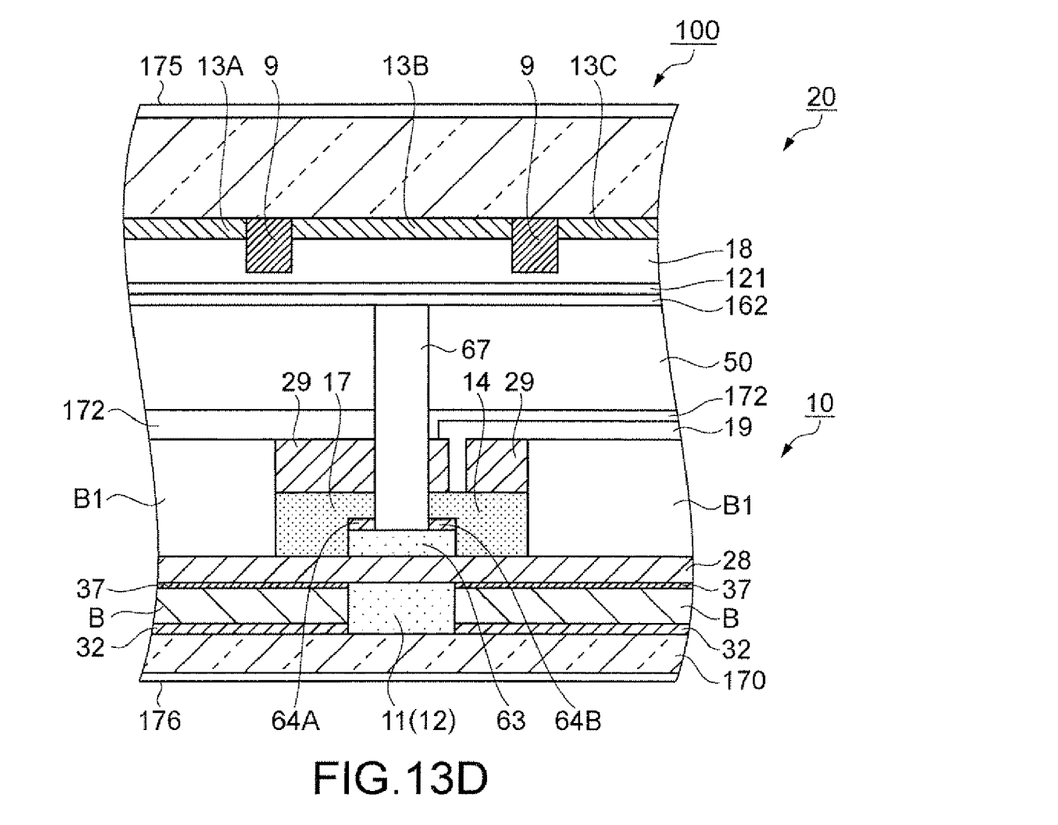

In FIG. 13(c), after the liquid repellent-processed layer 77 is removed, the insulating film 29 is formed so as to bury the concave section 74 in which the source electrode 17 and the drain electrode 14 are provided.

Next, a contact hole is formed in a part of the insulating film 29 covering the drain electrode 14 and the pixel electrode 19 patterned on the upper surface is formed to connect, via the contact hole, the drain electrode 14 and the pixel electrode 19.

Finally, the orientation film 172 is formed on the TFT array substrate 10. Then, the TFT array substrate 10 is combined with the opposed substrate 20 and the liquid crystal 50 is filled. Then, the polarization plates 175 and 176 are adhered to each other, respectively, thereby providing the liquid crystal display apparatus 100 shown in FIG. 13(d).

Embodiment 1 as described above provides effects as described below.

(1) The bank film 71 for forming the banks B1 and B2 also can be used to form the column spacer 67. This eliminates a need for new material and a new step, thus providing an improved production efficiency.

(2) The column spacer 67 can be formed in such a region in which the TFT element 30 is formed and that is different from a display region having the pixel electrode 19. Thus, in addition to the above-described effect, a light transmission efficiency or a reflection efficiency in a display region can be improved.

(3) The column spacer 67 also functions as the bank B2 as a partition for a position at which the functional fluid 81 for forming at least one of the source electrode 17 or the drain electrode 14 is placed. Thus, a switching element can be formed with an improved production efficiency.

(4) The liquid crystal display apparatus 100 that can achieve the above-described effect can be provided.

Embodiment 2

Next, the electronic device according to the invention will be described based on Embodiment 2.

The electronic device of Embodiment 2 is an electronic device including the liquid crystal display apparatus 100 described in Embodiment 1. A specific example of the electronic device of Embodiment 2 will be described.

Figure 14A:
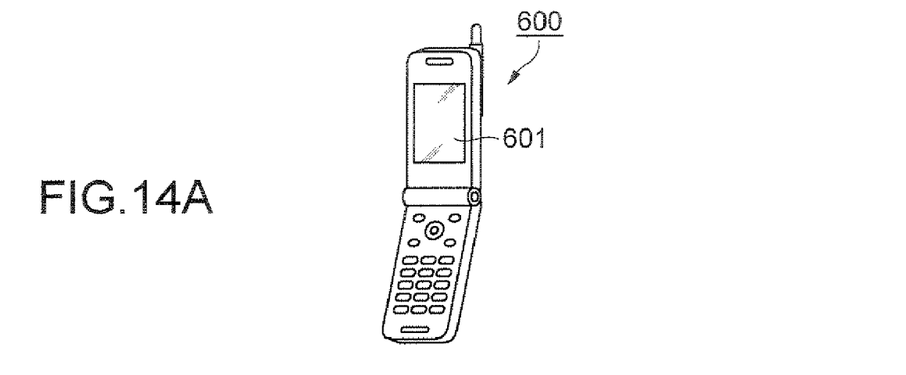
FIG. 14 illustrates an electronic device in Embodiment 2.

FIG. 14(a) is a perspective view illustrating an example of a mobile phone 600 as an example of the electronic device. In FIG. 14(a), the mobile phone 600 includes a liquid crystal display section 601 in which the liquid crystal display apparatus 100 of Embodiment 1 is installed.

Figure 14B:
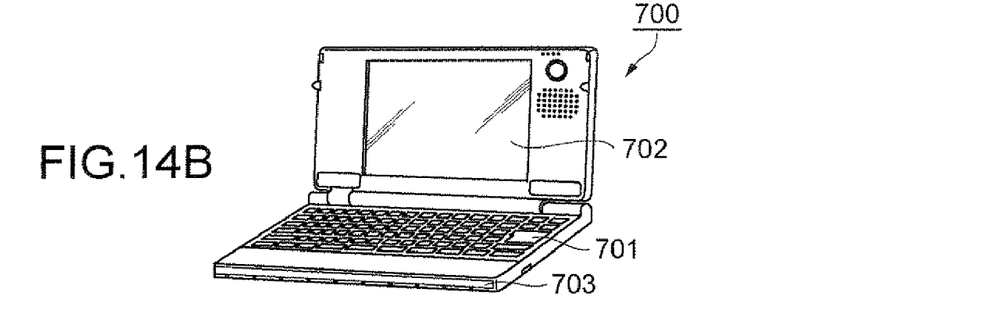

FIG. 14(b) is a perspective view illustrating an example of a mobile information processing apparatus 700 (e.g., word processor, personal computer). In FIG. 14(b), the mobile information processing apparatus 700 includes an input section such as a keyboard 701, an information processor 703, and a liquid crystal display section 702 including the liquid crystal display apparatus 100 of Embodiment 1.

Figure 14C:
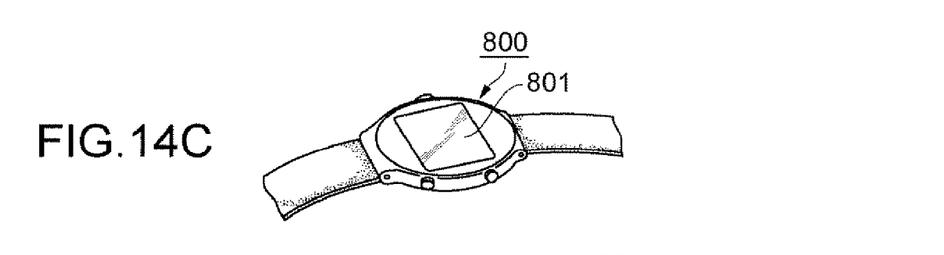

FIG. 14(c) is a perspective view illustrating an example of a wrist watch-type electronic device 800. In FIG. 14(c), the wrist watch-type electronic device 800 includes the liquid crystal display section 801 in which the liquid crystal display apparatus 100 of Embodiment 1 is installed.

Figure 14D:
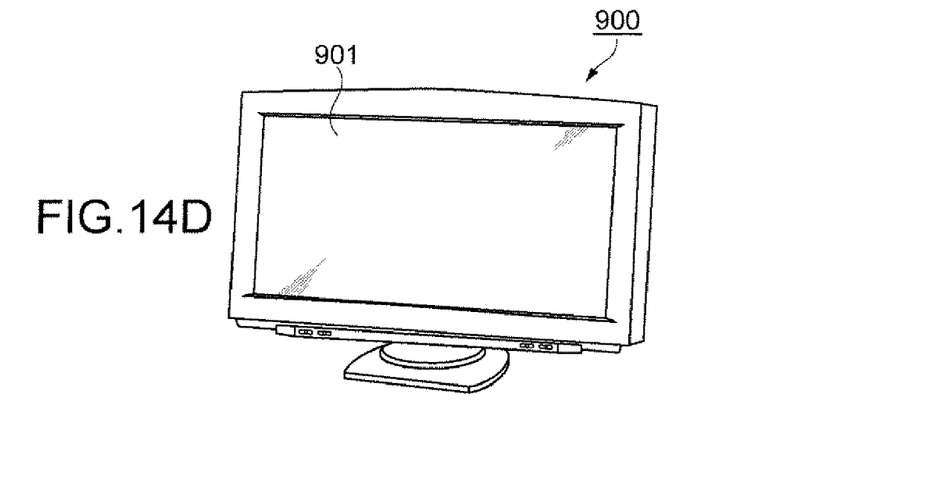

FIG. 14(d) is a perspective view illustrating a large-size liquid crystal TV 900. In FIG. 14(d), the large-size liquid crystal TV 900 includes a liquid crystal display section 901 in which the liquid crystal display apparatus 100 of Embodiment 1 is installed.

Embodiment 2 provides effects as described below.

(5) The mobile phone 600, the mobile information processing apparatus 700, the wrist watch-type electronic device 800, and the large-size liquid crystal TV 900 can be provided that are an electronic device that can be achieve the above-described effects.

It is noted that the invention is not limited to the above-described embodiments and change or modification for example within a range in which the objective of the invention can be achieved is included in the invention.

For example, the above embodiment etches the bank film 71 to provide the column spacer 67 on a region in which the TFT element 30 is formed. However, the bank film 31 also may be etched to provide the column spacer 67 in a region in which the black matrix 9 is formed.

Although the best method for carrying out the invention for example has been disclosed in the above description, the invention is not limited to this. Specifically, the invention has been described mainly with regards to specific embodiments, the above-described embodiments can be modified, without departing from the technical scope and objective of the invention, by those skilled in the art in various ways for to-be-used material, a processing time, and other details.

Thus, the above disclosed description limiting the material, a processing time or the like is an illustrative description for promoting an easy understanding of the invention and does not limit the invention. Thus, description not including a part and the entirety of the limitation of these material and processing time is included in the invention.

The entire disclosure of Japanese Patent Application No. 2005-353034, filed Dec. 7, 2005 is expressly incorporated by reference herein.

What is claimed is:

1. A method for manufacturing a display including a column spacer for controlling a distance between a switching element substrate and an opposed substrate opposed to the switching element substrate, comprising:

forming a bank film over the switching element substrate;
selectively etching the bank film to form a concave section;
selectively forming the bank film to form the column spacer; and
placing functional fluid in the concave section surrounded by the bank film, wherein:
the column spacer has a height that is greater than walls of the concave section.

2. The method for manufacturing a display according to claim 1, wherein:

the column spacer is formed on a region in which a switching element is formed.

3. The method for manufacturing a display according to claim 1, wherein:

functional fluid is placed at a predetermined position divided by the banks to form at least one of a source electrode or a drain electrode.

* * * * *